March 11, 1941.   F. AMIOT   2,234,394
AERIAL NAVIGATION MACHINE
Filed Nov. 5, 1938   2 Sheets-Sheet 2
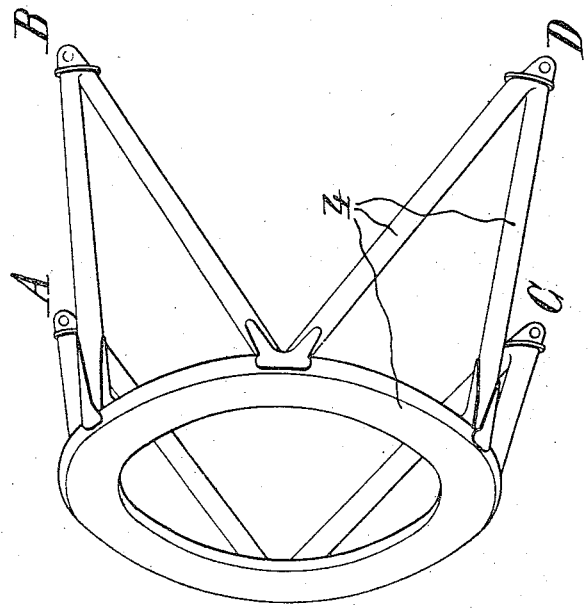
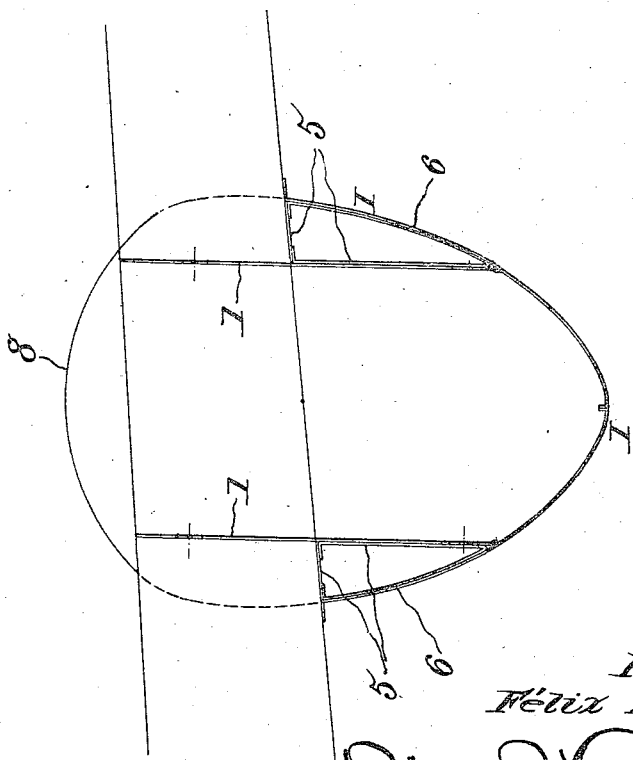
Inventor:
Félix Amiot,
Attorneys Patented Mar. 11, 1941

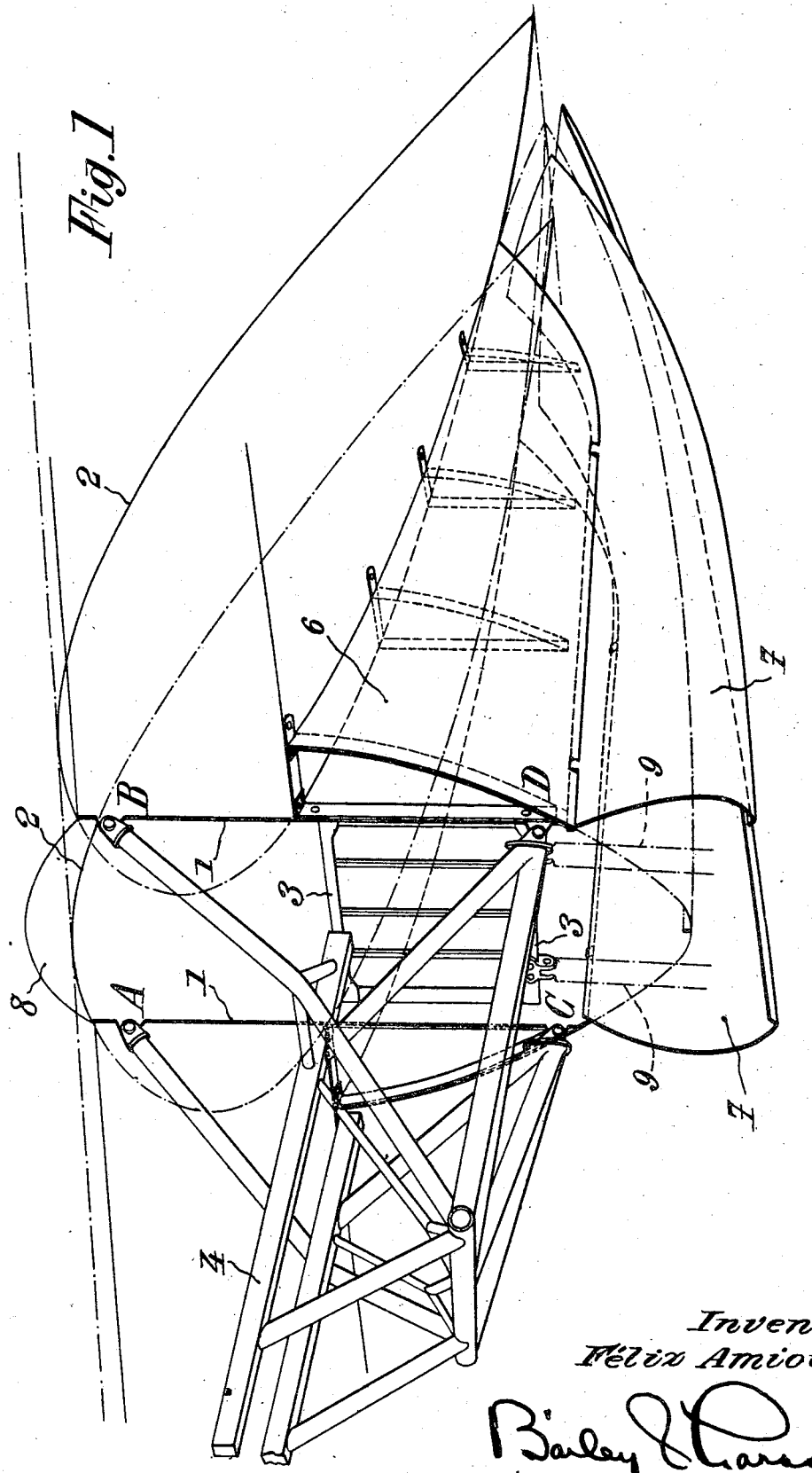

2,234,394

UNITED STATES PATENT OFFICE 2,234,394

AERIAL NAVIGATION MACHINE

Félix Amiot, Neuilly-sur-Seine, France

Application November 5, 1938, Serial No. 239,167
In Luxemburg February 14, 1938

6 Claims. (Cl. 244—54)

The present invention relates to aerial navigation machines provided with engines, of the kind including fuselages or cowls intended to surround in a continuous manner, according to suitable aerodynamic forms, the engines and also the portions of the structure or frame of the flying machine which support said engines.

The object of the present invention is to provide an aircraft of this kind which permits standard construction of the frame, while still adapted to various types of engines and having the best possible external aerodynamical shapes.

The essential feature of the present invention consists in providing, in machines of the kind above referred to, elements, capable of being mounted in a removable manner on portions of standard shape and size of the framework of the machine, said elements being adapted to act as supports for the cowlings of the machine or for cowling elements which fair into said engine cowls. The elements may be of variable shape according to the type of engine that is utilized.

Other features of the present invention will result from the following detailed description of some specific embodiments of machines made according to the invention.

Preferred embodiments of the present invention will be hereinafter described, with reference to the accompanying drawings, given merely by way of example and in which:

Fig. 1 is a perspective view showing in a diagrammatic manner, the system constituted by a wing and an engine nacelle (the engine being removed and the wing being but sketchily shown), said system being made according to the present invention;

Fig. 2 shows an engine frame (for a radial engine) adapted to be used in place of the frame shown by Fig. 1 and which is intended for an engine having its cylinders in line;

Finally, Fig. 3 shows the outline of a structure of the type shown in Fig. 1 for use with an engine having its cylinders in line.

In the following description, I will describe how my invention can be applied to the case of an engine nacelle to be provided on an airplane wing, in particular in lateral position with respect to the airplane fuselage. It should be well understood that such an arrangement is chosen merely by way of example and that I would proceed in the same manner in the case of an engine to be mounted in line with a fuselage, and in particular in the case of a single engined airplane.

Concerning first the general structure of the aircraft, that is to say the whole of said aircraft with the exception of the portion thereof that is intended to support directly the engine nacelle, it is made in any suitable manner, either conventional or not.

As for the system constituted by the engine nacelle and the adjoining portion of the aircraft structure that supports it, according to the invention, it is made in the following manner:

First, the aircraft structure includes, at the place of the engine nacelle to be provided, a framework capable of supporting any type of engine (radial engine, V-shaped engine, W-shaped engine, H-shaped engine, and so on) and also the nacelle corresponding thereto.

As for the engine nacelle proper, it is constituted, either wholly or in part, by elements adapted to be mounted in a removable manner on said framework, in such manner that it is possible to provide, for each different type of engine, elements of shapes which are also different and constructed in such manner that they ensure, for the whole of the engine nacelle, the best possible aerodynamic shape, and a cross section of an area as small as possible.

An arrangement of the type above referred to is illustrated by Figs. 1 and 3.

In this case, the framework, that is to say the part of the system that is common to all the engine nacelles which can be mounted on a given aircraft structure, will be, for instance, essentially constituted by two vertical parts 1 parallel to the fore and aft axis of the aircraft and which may constitute extensions of ribs of the aircraft structure, said main parts being braced by means of suitable cross members 3.

The whole is arranged in such manner that the width and the height of the framework thus obtained correspond to the dimensions of the engine supporting frames, which supporting frames are made in any suitable manner, either conventional or not, and are for instance fixed to the aircraft framework at four points A, B, C, D.

In the embodiment of Fig. 1, I have shown an engine supporting frame or cradle 4, for use with an engine having its cylinders in line, but, according to the essential feature of the present invention, this supporting frame 4 can be replaced by any other supporting frame adapted to the size of the engine nacelle that is considered, for instance by the supporting frame 4 of Fig. 2, which corresponds to the case of a radial engine.

In most cases, the aircraft framework above referred to will project outwardly from the surface of the wing, either merely below said wing, as shown, or above it, or again both below and above, according to the general shape chosen for the nacelle.

I provide, according to the invention, for supporting the external cowl of said nacelle, at least in the portions thereof that project outwardly from the wing surface. The elements above referred to will be, according to the type of engine that is chosen, arranged in such manner that the nacelle has the best possible aerodynamic properties. As a rule, the shape of said nacelle will be determined by that of the cowl (for instance a NACA cowl) to be fitted on the engine that is chosen (said engine cowl being not shown on the drawings).

In the case of an engine having its cylinders in line, the shape of the nacelle cowling will be that shown by Fig. 1 and by I of Fig. 3. Other shapes corresponding to the shape of the particular type of engine may be used.

I will now consider the specific means for constituting said removable and interchangeable elements of the engine nacelle. Of course, there are many different manners, for someone skilled in the art, of making these elements. A preferred embodiment is given by the drawings, merely by way of example.

In this embodiment, at least some of these elements, and in particular those located laterally with respect to the central structure 1, form a series of brackets 5 adapted to be fixed respectively to said structure and, in the case illustrated by the drawings, to the underside of the wing. Brackets 5 are adapted to support the metal sheets 6 which consistute the external wall of the engine nacelle.

It will be readily understood that if the engine having its cylinders in line of Fig. 1 is replaced by an engine of different shape, for instance by a radial engine, brackets 5 are replaced by other brackets, similarly disposed but of different shape in such manner that the metal sheets (or other covering) they support, are given a section corresponding to another outline in accordance with the particular shape of the engine.

If now, the engine nacelle is intended to include a retractable landing gear, as it is assumed in the disclosure of Fig. 1, said landing gear being diagrammatically indicated by 9, it is advantageous to have recourse, at the lower part of the nacelle, to opening metal sheets 7, which may themselves be interchangeable so as to form the lower portion corresponding, in curvature, to the outline of the upper portion.

Preferably, according to a feature of the present invention, these curved plates 7 will be supported by the corresponding lateral elements 5 and 6 of the nacelle structure. For instance, as shown by Figs. 1 and 3, these bent plates 7 are hinged to the lower edges of plates 6, but of course any other arrangement could be employed within the scope of my invention.

At the rear, on the side of the trailing edge of the aircraft wing, elements 5 and 6 on the one hand, and plates 7 on the other hand are suitably arranged in such manner as to fair into the surface of the wing.

Concerning now the top portion 8 of the engine nacelle, this portion is, in the embodiment illustrated by the drawings, fixed or stationary. But it should be well understood that this portion 8 also might be interchangeable in such manner as to permit of obtaining different outlines.

Whatever be the particular embodiment that is chosen, I obtain a system the application of which results sufficiently clearly from the above description for making it unnecessary to enter into further explanations.

The system according to the present invention has over systems for the same purpose existing at the present time, many advantages among which the following may be cited:

It permits manufacture of a great number of aircraft structures which are all similar although they may be intended to be fitted with engines of different makes. Since the differences concern merely removable parts to be fixed to said aircraft structure. Of course, this reduces the cost of manufacture.

It is possible easily to replace engines fitted on an aircraft by another kind, provided that the removable elements above mentioned are replaced at the same time as the engine itself is replaced.

In all cases, it is much easier to have access to the inside of the structure of the engine nacelles by removing the elements in question so that upkeep and repair are greatly facilitated.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an aircraft, the combination of a frame structure including two spaced, longitudinal, substantially flat members forming a part of said frame structure, said members being disposed in vertical planes and extending substantially beyond the remainder of said frame structure, the front ends of said members forming means for supporting, selectively, any one of a plurality of engine assemblies having cowlings of various cross sectional shapes, respectively, and a plurality of substantially triangular brackets removably mounted in spaced relationship along the outer sides of said members, one side of each of said brackets being affixed to a horizontal portion of said frame structure, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape.

2. In an aircraft, the combination of a frame structure including two spaced, longitudinal, substantially flat members forming a part of said frame structure, said members being disposed in vertical planes and extending substantially beyond the remainder of said frame structure, transverse bracing means between the inner sides of said members, the front ends of said members forming means for supporting, selectively, any one of a plurality of engine assemblies having cowlings of various cross sectional shapes, respectively, and a plurality of substantially triangular brackets removably mounted in spaced relationship along the outer sides of said members laterally opposite said transverse bracing means, one side of each of said brackets being affixed to a horizontal portion of said frame structure, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape.

3. In an aircraft, the combination of a wing structure including two, spaced, longitudinal, substantially flat members rigid with said wing, said members being disposed in vertical planes and projecting from said wing, bracing means between the inner sides of said members, the front ends of said members forming means for supporting, selectively, any one of a plurality of engine assemblies having cowlings of various cross sectional shapes, respectively, and a plurality of substantially triangular brackets removably mounted in spaced relationship along the outer sides of said members, one side of each of said brackets being affixed to a flat portion of said wing, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape.

4. In an aircraft, the combination of a wing structure including two, spaced, longitudinal, substantially flat members rigid with said wing, said members being disposed in vertical planes and projecting below said wing, transverse bracing means between the inner sides of said members, the front ends of said members forming means for supporting, selectively, any one of a plurality of engine assemblies having cowlings of various cross sectional shapes, respectively, and a plurality of substantially triangular brackets removably mounted in spaced relationship along the outer sides of said members, one side of each of said brackets being affixed to the under side of said wing, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape.

5. In an aircraft, the combination of a wing structure including two spaced, longitudinal, substantially flat members rigid with said wing, said members being disposed in vertical planes and projecting below said wing, transverse bracing means between the inner sides of said members, the front ends of said members forming means for supporting, selectively, any one of a plurality of engine assemblies having cowlings of various cross sectional shapes, respectively, and a plurality of of substantially triangular brackets removably mounted in spaced relationship along the outer sides of said members laterally opposite said transverse bracing means, one side of each of said brackets being affixed to the under side of said wing, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape.

6. In an aircraft, the combination of a wing structure including two, spaced, longitudinal, substantially flat members rigid with said wing, said members being disposed in vertical planes and projecting from said wing, bracing means between the inner sides of said members, the front ends of said members forming means for supporting, selectively, any one of a plurality of engine assemblies having cowlings of various cross sectional shapes, respectively, a plurality of substantially triangular brackets removably mounted in spaced relationship along the outer sides of said members, one side of each of said brackets being affixed to a flat portion of said wing, the second side of each of said brackets being affixed to the outer face of one of said members, the third side of each of said brackets being curved in accordance with the cross sectional shape of the cowling selected whereby removably to support curved sheet metal covering sheets, the curvatures of which are based upon said cross sectional shape, and curved metal sheets pivotally attached to the lower edges of said members and movable between two positions, in the first of which positions the lower edges of said metal sheets are engaged with each other whereby to form a substantially closed assembly, and in the second of which positions said sheets are open whereby to expose a retractable landing gear or the like, and means for pivoting said sheets between said positions.

FÉLIX AMIOT.